Sept. 11, 1962 J. RAUENBUEHLER 3,053,376
CONVEYOR APPARATUS
Filed Oct. 14, 1959 2 Sheets-Sheet 1

Sept. 11, 1962 J. RAUENBUEHLER 3,053,376
CONVEYOR APPARATUS
Filed Oct. 14, 1959 2 Sheets-Sheet 2
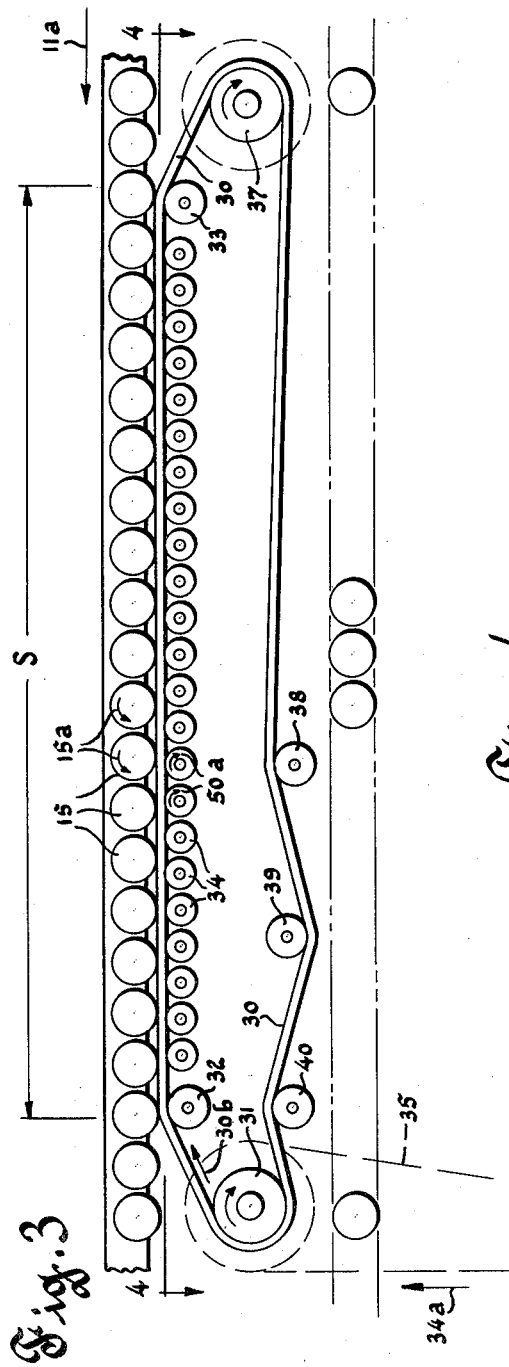
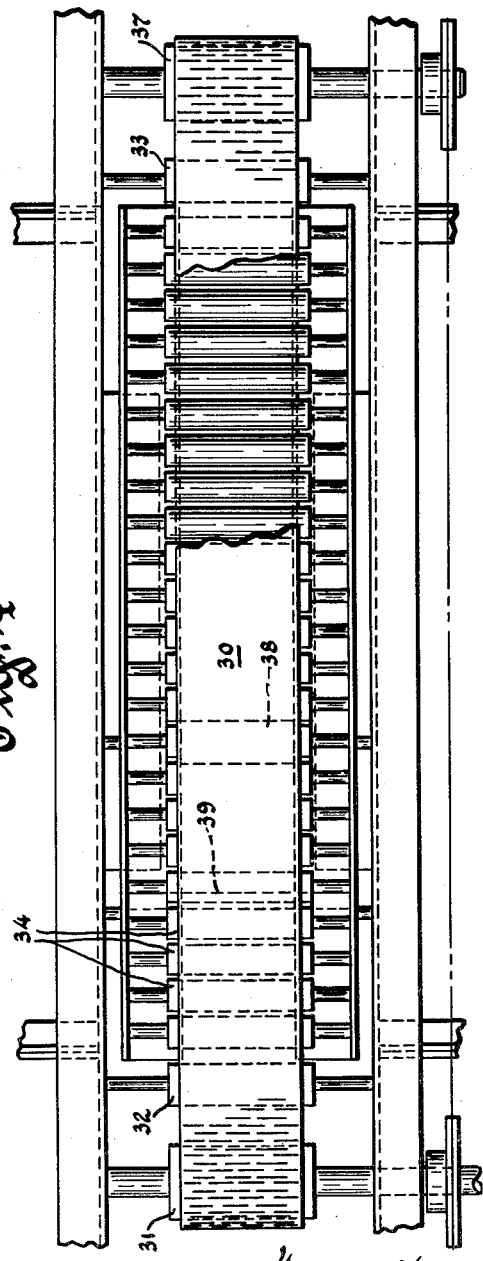
Inventor
John Rauenbuehler United States Patent Office 3,053,376
Patented Sept. 11, 1962

3,053,376
CONVEYOR APPARATUS
John Rauenbuehler, Milwaukee, Wis., assignor to Cutler-Hammer, Inc., Milwaukee, Wis., a corporation of Delaware
Filed Oct. 14, 1959, Ser. No. 846,323
5 Claims. (Cl. 198—33)

This invention relates generally to conveyors. More particularly it relates to apparatus for effecting reorientation of conveyed articles as the articles are transferred from one conveyor to another.

In newspaper mailrooms it is sometimes necessary to transfer a free standing, untied stack of newspapers from one conveyor to another and to turn the stack about its vertical axis in the course of the transfer so that it will be properly oriented on the other conveyor in readiness for further operations. Prior art apparatus for effecting reorientation of articles being transferred from one conveyor to another sometimes employ barrier means against which the conveyed articles are forced in order to alter their position. Some prior art apparatus employs means which physically grip the articles and turn them before depositing them on the other conveyor. While the aforedescribed apparatus has proven satisfactory for its intended use, such apparatus is not suitable for handling free standing, untied stacks of newspapers or like materials because of the possibility of misaligning the newspapers forming the stack. Furthermore, the complexity and expensiveness of other known types of conveyor switching arrangements often preclude their use.

Accordingly, it is an object of this invention to provide improved conveying apparatus for turning a conveyed article about its vertical axis as it is transferred from one conveyor to another.

Another object is to provide improved conveying apparatus of the aforesaid character which is especially well suited for handling free standing, untied stacks of sheet-like material, such as newspapers.

Still another object is to provide improved apparatus of the aforesaid character which employs components which are readily adapted for use with existing types of conveyors.

A further object of the invention is to provide improved conveying apparatus which is reliable in use, employs readily available components, is relatively uncomplicated in structure, economical to manufacture, and readily adaptable to a wide variety of installations.

Other objects and advantages of the invention will hereinafter appear.

In the drawings:

FIG. 3 is a side elevational view, partly schematic, of roller driving means which are employed with the roller type conveyor shown in FIG. 1; and FIG. 4 is a top plan view, partly schematic, of the roller driving means shown in FIG. 3.

The drawings illustrate a preferred embodiment of the invention, but it is to be understood that various modifications with respect to details could be made to the embodiment illustrated without departing from the scope of the appended claims.

Figure 1:
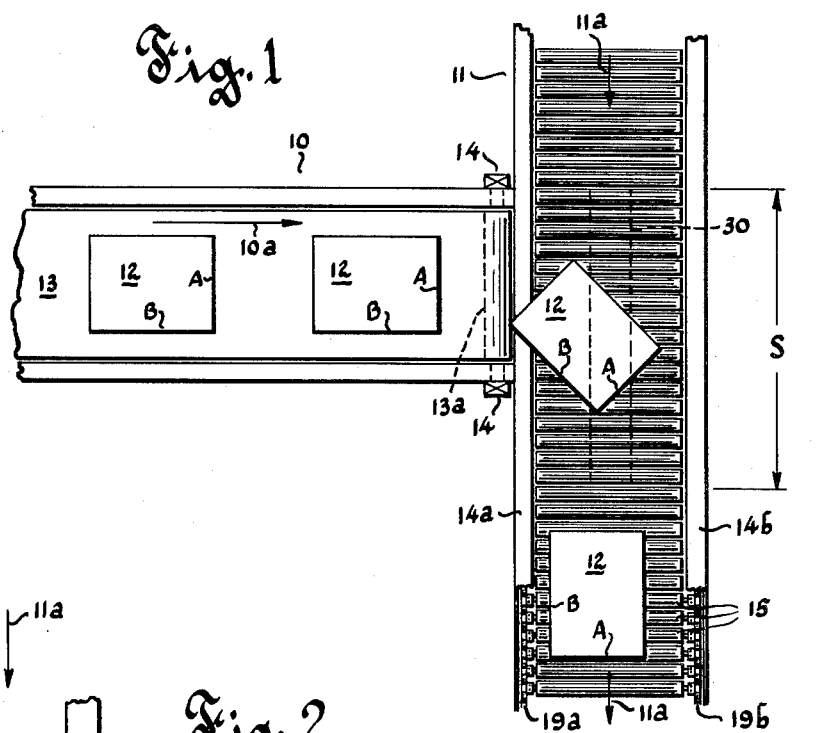
FIGURE 1 is a top plan view, schematic in form, of a conveyor installation incorporating the invention.

FIGURE 1 is a top plan view, partly schematic, of a conveyor installation which is sometimes employed in the so-called "mail room" of newspaper publishing plants, with which the present invention is employed to advantage. The installation comprises a well known, belt type conveyor 10 hereinafter more particularly described and a well known roller type conveyor 11, hereinafter described in detail, which is disposed perpendicular to the discharge end of conveyor 10. Stacks 12 of spaced apart, free standing, untied, folded newspapers which have been deposited on conveyor 10 are conveyed thereby in the direction of the arrow 10a and eventually are deposited onto conveyor 11 which conveys them in the direction of the arrow 11a. Normally, if the end of the stacks 12 designated by the letter A is leading as the stacks move along conveyor 10, then the side of the stacks designated by the letter B will lead as the stacks move along conveyor 11. This is because the stacks 12 normally are not substantially reoriented as they move from one conveyor to the other. In some installations, because of the type of tying machine (not shown) employed at the end (not shown) of conveyor 11, it is necessary to reorient the stacks 12 so that the end A leads on conveyor 10 and continues to lead after the stack has been transferred to conveyor 11. This orientation is shown in FIG. 1 and is accomplished in accordance with the present invention as will hereinafter be more fully explained.

As FIG. 1 shows, conveyor 10 comprises a flat flexible belt 13 which passes around an idler roller 13a which is supported by bearings 14. It is to be understood that conveyor 10 also comprises suitable framework (not shown) and is provided with suitable means (not shown) for driving the belt 13 in the direction of arrow 10a. It is preferred to use a flat, flexible belt 13 fabricated, for example, of rubber coated fabric rather than wire belts (not shown) so that good frictional engagement exists between the belt surface and the bottom of the stacks 12 which facilitates movement of the stacks off conveyor 10 and onto conveyor 11. However, other types of conveyors which function as does conveyor 10 in propelling the stacks off of the end thereof may be employed.

As FIG. 1 also shows, conveyor 11 comprises two flat surfaced, stationary, parallel side members or aprons 14a and 14b, which, if preferred, may form part of the supporting framework thereof. The surface of the apron 14a lies substantially in the same plane as the upper surface of belt 13 of conveyor 10 adjacent thereto so that the stacks 12 may slide readily thereacross onto the rollers of conveyor 11.

Figure 2:
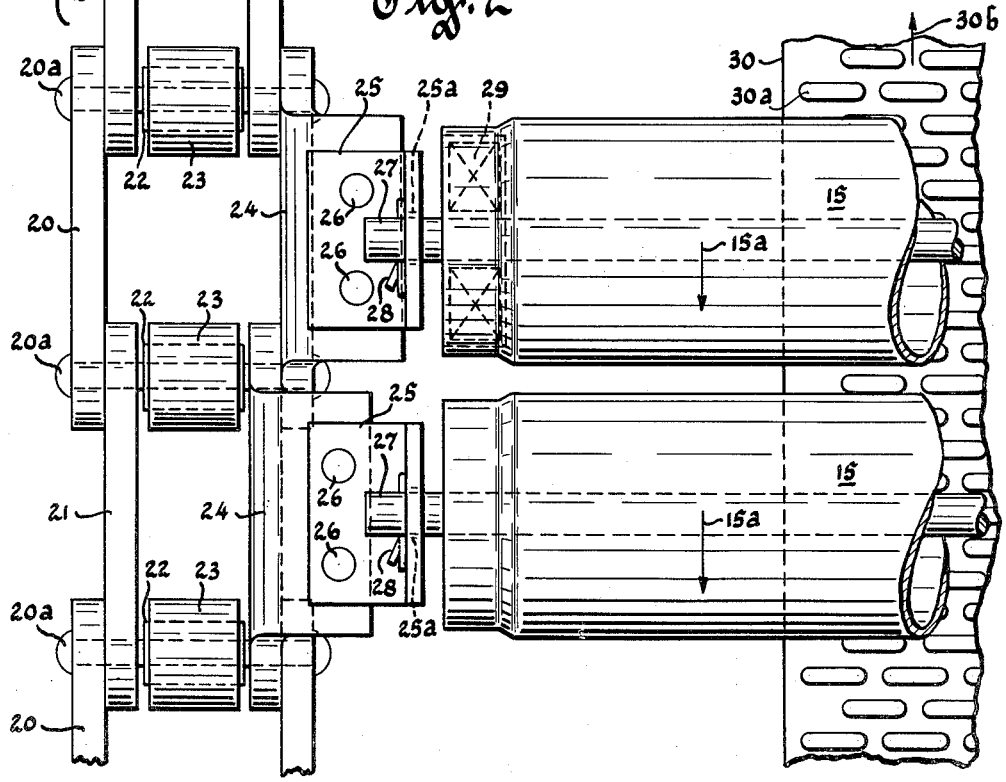
FIG. 2 is a view, somewhat enlarged, of details of the operating mechanism of a roller type conveyor shown in FIG. 1.

A plurality of cylindrical spaced apart rollers, generally designated 15, comprise conveyor 11 and are associated with the chains 19a and 19b which move them in the direction of arrow 11a. Chains 19a and 19b are parallel to each other and are disposed beneath the aprons 14a and 14b, respectively. Each chain is flexible and is adapted to be driven by sprocket wheels (not shown). The rollers 15 are associated with the chains 19a and 19b as shown in FIG. 2, which shows particularly the details of construction of chain 19a and the connection thereof to the left-hand end of two rollers 15. It will be understood that the right-hand ends of the rollers 15 are connected in a similar manner to chain 19b. Chain 19a comprises a plurality of side bars 20, each of which has two pins 20a rigidly attached thereto. A side bar 21, having a hole (not shown) near each end is slid over the pins of the side bars 20 to link two side bars 20 together. A bushing 22 is then press fitted on each pin and rotatable roller members 23 are slid onto each bushing 22. Flanged side bars such as 24 are then placed on the pins 20a and the pins are peened over. An L-shaped bracket 25 is secured to the flange of each side bar 24 with the bolts 26. The upstanding leg of each bracket 25 is provided with a hole 25a which accommodates the end of the rigid roller axle 27 which is kept in place by a cotter key 28. Each roller 15 has a ball or roller bearing 29 attached at either end and the bearing is press fitted on axle 27. Thus, the roller 15 is normally free to rotate about axle 27 and is adapted to be carried along with the chains 19a and 19b as the chains are moved. If preferred, apparatus other than the above described chains may be employed to effect linear movement of the rollers 15.

It is to be noted that the topmost portion of each roller 15 moves in a plane which is below but as close as practical to that in which the flat surfaces of the aprons 14a and 14b lie so that the stacks can slide onto the rollers without interference.

In accordance with the present invention, a section of conveyor 11 adjacent the discharge end of conveyor 10 is designated as the "speed up" section S, as FIGS. 1, 3 and 4 show. As will hereinafter be more fully explained, a stack 12 moving off of conveyor 10, across apron 14a and onto "speed up" section S of conveyor 11 is caused to turn about its vertical axis and is reoriented as shown in FIG. 1 for further movement by conveyor 11. As the rollers 15 are moved through section S by the chains 19a and 19b, means hereinafter described, are employed to cause the rollers 15 to rotate in the direction of the arrows 15a (see FIGS. 2 and 3). Relatively speaking, the tops of the rollers 15 within section S are then moving in the same general direction as the rollers themselves are being carried by the chains 19a and 19b but at a greater velocity.

Rotation of the rollers 15 in section S is effected by frictionally driving them by means of an endless, flexible moving belt 30 which engages the bottom side of the rollers 15. Preferably, belt 30 is made of rubber coated fabric, or like material, and is provided with integrally formed projections or fingers 30a (see FIG. 2) on the working surface thereof which insure good driving engagement between the belt and the rollers 15. Belt 30 passes around a driven roller 31, and two idler rollers 32 and 33 which define the extent of section S and around additional idler rollers 37, 38, 39 and 40. A plurality of idler rollers, generally designated by the numeral 34, and which rotate in the direction of the arrows 50a, are disposed beneath the belt 30 between rollers 32 and 33 and are adapted to press the belt against the conveyor rollers 15 to insure good contact therebetween. Belt 30 is adapted to be driven in the direction of the arrow 30b by roller 31 which is driven by a belt 35 which is driven in the direction of the arrow 34a by suitable driving means such as a motor (not shown). It is to be understood that the various rollers are suitably supported by framework, as FIG. 4 shows. In a preferred embodiment, the belt 30, its rollers and the driving means for roller 31 and the framework are physically distinct from conveyor 11 and form a separate portable unit. Thus, section S of conveyor 11 could be shifted to accommodate the particular location of conveyor 10 in any given installation. If preferred, other means for effecting the aforedescribed rotation of rollers 15 may be employed.

The invention operates as follows:

Assume that conveyor 10 is in operation and that spaced apart, free standing, untied stacks 12 of newspapers are being conveyed therealong in the direction of arrow 10a with the side A of the stacks leading. Further assume that conveyor 11 is in operation and that the rollers 15 are being moved by the chains 19a and 19b in the direction of the arrow 11a at the same velocity as belt 13 of conveyor 10. Further assume that belt 30 is in operation and that the rollers 15 passing through section S are rotating in the direction of the arrows 15a. Assume that the linear velocity of belt 30 is such that the peripheral velocity of the rollers 15 in section S is about four times their linear velocity.

As each such stack 12 leaves conveyor 10 it begins to slide across apron 14a. As the bottom of the stack engages the rollers 15 in "speed up" section S the forwardmost end of the stack is being moved thereby while a portion of the stack still rests on apron 14a. Thus, the stack begins to rotate about its vertical axis. Simultaneously, the stack is being moved further out onto conveyor 11 by the driving action of belt 13 of conveyor 10 and by the pulling action of the rollers 15 of conveyor 11. In the particular embodiment shown, by the time the stack 12 is moved completely onto the rollers 15 in "speed up" section S it has been caused to rotate almost 90° from its original orientation on conveyor 10. The stack 12 is then carried to the end of "speed up" section S and moves along conveyor 11 at the normal velocity thereof.

It will be understood that since conveyor 10 is perpendicular to conveyor 11 it is necessary to rotate each stack 12 approximately 90° to achieve the desired orientation. If conveyor 10 were disposed at some other angle with respect to conveyor 11, a greater or lesser degree of rotation of each stack may be required. The extent to which a stack is turned depends, of course, on the relationship between the speed of both conveyors, the angle between the conveyors, the speed of rotation of the rollers 15 in the "speed up" section, and the width of apron 14a.

The hereinbefore described invention is suitable for effecting reorientation of all sorts of articles about their vertical axis as they move from one conveyor to another. It is particularly advantageous for use with untied stacks of sheet-like articles such as newspapers because all forces are initially exerted against the bottom of the stack and there is no danger that the stack will be misaligned since no other portions are contacted by the apparatus.

I claim:

1. In combination, a first conveyor, a second conveyor disposed adjacent the discharge end of said first conveyor, said second conveyor comprising a plurality of linearly movable conveying rollers, and means for effecting rotation of said rollers as they move through an area opposite the discharge end of said first conveyor to increase the conveying speed of said rollers above the speed of said first conveyor so that an article leaving said first conveyor and moving onto said second conveyor is rotated about its vertical axis a desired amount depending upon the conveying speed of said rotating rollers relative to the speed of said first conveyor.

2. In combination, a first conveyor, a second conveyor disposed adjacent the discharge end of said first conveyor, said second conveyor comprising a multiplicity of carrying rollers arranged so that their axes are parallel to each other and said rollers are linearly movable in a direction transverse to their axes, and means for effecting rotation of said rollers as they move through a zone opposite the discharge end of said first conveyor to increase the carrying speed of said rollers above the carrying speed of said first conveyor so that an article moving off of said first conveyor and onto said second conveyor within said zone is caused to rotate about its vertical axis.

3. The combination according to claim 2, wherein said means comprises a driven belt which frictionally engages and rotates said rollers while the latter are in said zone.

4. In a conveyor system adapted for conveying free-standing, untied stacks of relatively flat articles, a first conveyor for conveying said stacks in series and having a discharge end, a second conveyor for receiving said stacks in succession from said first conveyor, said second conveyor being contiguous to and arranged transversely of the discharge end of said first conveyor, said second conveyor comprising a series of traveling rolls and being normally ineffective to turn said stacks a desired amount as they enter thereon, and means for turning said stacks so that the ends thereof which lead as they are conveyed by said first conveyor also lead as they are conveyed by said second conveyor, said turning means comprising roll drive means mounted on said second conveyor at the discharge end of said first conveyor and causing rotation of a constantly-changing group of said rolls traveling linearly past the discharge end of said first conveyor in a direction whereby the upper peripheral portions of the rolls of said group move in the same direction as said rolls travel, and the peripheral speed of said group of rolls being added to the linear speed of said rolls to increase the conveying speed of said group of rolls above the conveying speed of said first conveyor thereby to effect turning of said stacks upon entering said group of rolls in the conveying direction of said second conveyor.

5. The invention defined in claim 4, wherein said roll drive means comprises a driven, endless belt mounted beneath said rolls and having an upper portion driven in a direction opposite to the direction of linear movement of said rolls, and a series of idler rollers maintaining said upper portion of said belt in frictional engagement with the lower peripheral portions of said rolls of said group whereby the upper peripheral portions of said rolls of said group are driven by said belt in the same direction as said rolls travel to increase the article-conveying speed thereof.

References Cited in the file of this patent
UNITED STATES PATENTS

| | | |
|---|---|---|
| 733,804 | Blaisdell | July 14, 1903 |
| 1,034,641 | Parker | Aug. 6, 1912 |
| 2,947,405 | Fenton | Aug. 2, 1960 |